United States Patent [19]

Stevenson

[11] Patent Number: 4,457,095
[45] Date of Patent: Jul. 3, 1984

[54] FISHING LINE HOLDER

[76] Inventor: Richard F. Stevenson, 205 Center St., Oregon City, Oreg. 97045

[21] Appl. No.: 312,786

[22] Filed: Oct. 19, 1981

[51] Int. Cl.³ .................. A01K 87/02; A01K 87/04
[52] U.S. Cl. .................................. 43/25.2; 24/16 PB
[58] Field of Search .................. 43/25, 25.2; 24/16 PB

[56] References Cited

U.S. PATENT DOCUMENTS

| | | | |
|---|---|---|---|
| 309,028 | 12/1884 | Byington | 43/25.2 |
| 2,028,477 | 1/1936 | Rupp | 43/25.2 |
| 2,556,403 | 6/1951 | Sokolik | 43/25.2 |
| 2,650,448 | 9/1953 | Lichtig | 43/25 |
| 2,805,510 | 9/1957 | DePamphilis | 43/25.2 |
| 2,846,804 | 8/1958 | Elliott | 43/25 |
| 2,878,610 | 3/1959 | Herstedt | 43/25.2 |
| 3,164,334 | 1/1965 | Gris | 43/25 |
| 3,411,232 | 11/1968 | Rumbaugh | 43/25.2 |
| 3,545,119 | 12/1970 | Murnan | 43/25 |
| 3,581,428 | 6/1971 | Helder | 43/25 |
| 3,665,635 | 5/1972 | Lumbard | 43/25.2 |
| 3,839,811 | 10/1974 | Hopkins | 43/25.2 |
| 3,927,488 | 12/1975 | Peddy | 43/25 |
| 3,988,850 | 11/1976 | Steinman | 43/25.2 |
| 4,093,288 | 6/1978 | Suzuki | 24/16 PB X |
| 4,128,220 | 12/1978 | McNeel | 24/16 PB X |

Primary Examiner—Nicholas P. Godici
Assistant Examiner—Thomas S. Mieczkowski
Attorney, Agent, or Firm—Glen A. Collett

[57] ABSTRACT

A fishing line holder for supporting the free end of a fishing line when transporting the fishing gear. The apparatus includes a block having a slot therein for receiving the line and a mounting structure for securing the block to the pole.

7 Claims, 6 Drawing Figures

U.S. Patent   Jul. 3, 1984   4,457,095
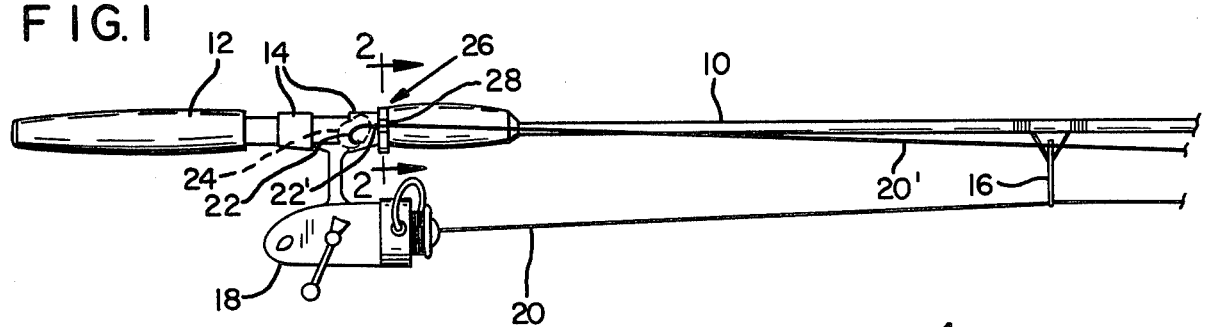
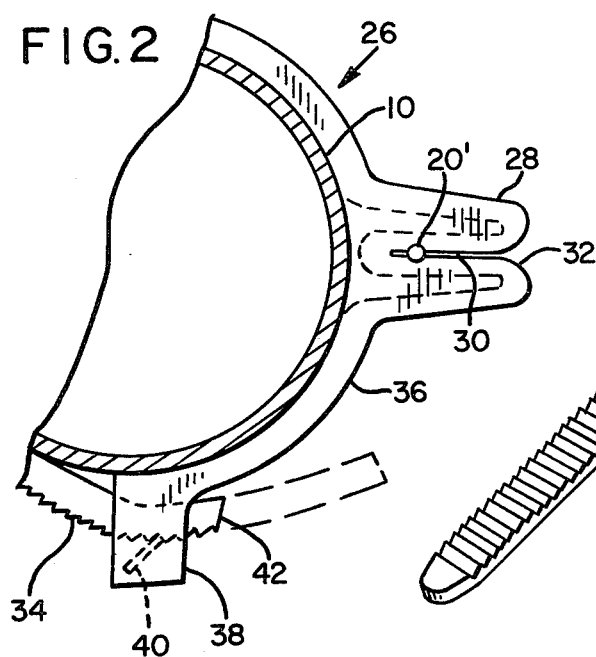
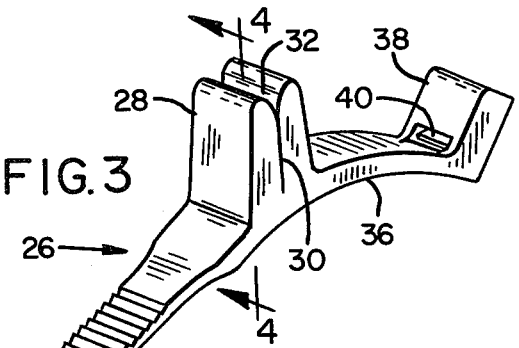
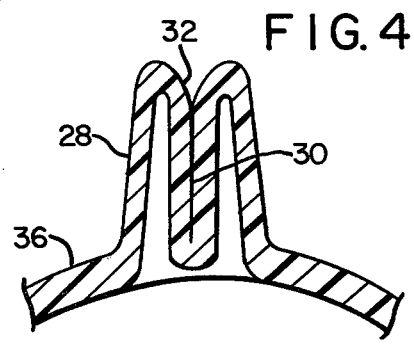
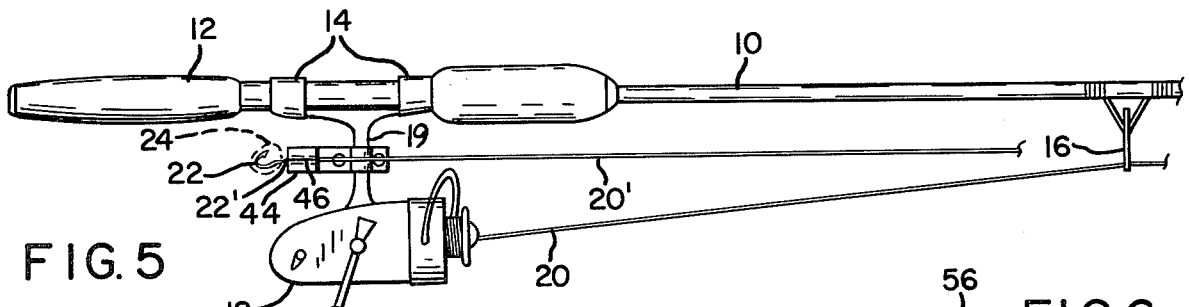
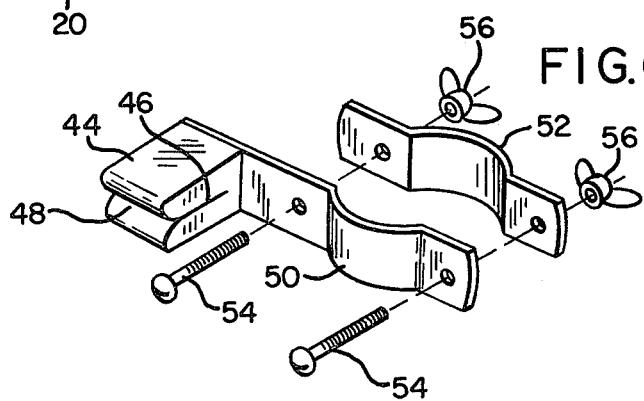

FISHING LINE HOLDER

BACKGROUND OF THE INVENTION

This invention relates to an apparatus for securing and supporting the free end of a fishing line for use during transport of an assembly of fishing gear. It particularly relates to such an apparatus which engages the line only, leaving the hook and bait unencumbered.

In sport fishing, such as fishing along a river, creek or lake, it is often desirable to move from fishing spot to fishing spot. The fishing gear, including the pole, line, hook and bait, is already assembled. During transport a free end of the line extends from the tip of the pole. In order to avoid snagging and tangling of this free end of line the fisherman is usually required to hold the line taut. This, of course, causes great inconvenience to the fisherman since use of both hands is required to hold the pole and line.

It is common practice to fasten the hook to the pole at a point near the handle, and then tension the line to keep it in place. Loops of wire are sometimes provided on the pole for this purpose, or the hook may be engaged in the cork handle of a pole or in one of the eyes. Various devices are disclosed in the prior art which attach to the pole to perform this hook engaging function.

However, when the hook is engaged as in the prior art devices the bait on the hook is ruined. Thus when the fisherman reaches his next fishing spot he is required to remove any remaining bait and apply new bait to the hook before fishing.

Accordingly, it is the general object of the present invention to provide a fishing line holder for securing the free end of the fishing line during transport of the fishing gear.

Another object is to provide an apparatus which does not interfere with bait on the hook.

Yet another object is to provide a fishing line holder which is simple and easy to install and use.

A further object is to provide a device which is of low cost and is easy to manufacture.

These and other objects and advantages of the present invention and the manner in which they are achieved will be made apparent in the following specification and claims.

SUMMARY OF THE INVENTION

In its basic concept the apparatus of the present invention is a fishing line holder for supporting the free end of a fishing line and includes a block having a slot therein for receiving the line and means for securing the block on the pole.

BRIEF DESCRIPTION OF THE DRAWINGS

FIG. 1 is a fragmentary elevation of a set of fishing gear including the first embodiment of the fishing line holder of the present invention.

FIG. 2 is a section taken along the line 2—2 in FIG. 1.

FIG. 3 is a top perspective view of the first embodiment of the fishing line holder.

FIG. 4 is a fragmentary section taken along the line 4—4 of FIG. 3.

FIG. 5 is a fragmentary elevation of a set of fishing gear similar to FIG. 1 including the fishing line holder of the present invention in a second embodiment.

FIG. 6 is an exploded top perspective view of the second embodiment of the fishing line holder.

DESCRIPTION OF THE PREFERRED EMBODIMENTS

As shown in FIG. 1, sport fishing gear normally includes a pole 10 having a handle 12, reel mounting apparatus 14, and an eye 16. A reel 18 is mounted by its shank 19 on the pole and carries a fishing line 20. The line is threaded through the eye 16 and on to the tip (not shown) of the pole. A hook 22 having an eye 22' is fastened to the end of the line and holds bait 24.

When transporting the fishing gear from spot to spot the free end of the line 20' is drawn back toward the handle of the pole. The line is fastened in the fishing line holder of the present invention, shown in its first embodiment generally at 26.

The first embodiment of the invention is shown in more detail in FIGS. 2 and 3. The device includes a block 28 having a slot 30 therein for receiving line 20'. Preferably, the outside end of the slot is flared at 32 to facilitate engagement with the line.

Means to mount block 28 on pole 10 is provided. In the first embodiment the mounting means is a ratchet strip such as is commonly used for bundling wires. The ratchet strip includes an elongated, flexible toothed portion 34, a curved portion 36, having approximately the same radius as the pole, and a locking end 38 including a pawl 40.

Block 28 is preferably formed integrally with the ratchet strip, and, as shown in FIGS. 2 and 4 may be hollow to facilitate manufacture. The material of which the block is formed is of a resilient nature so as to allow line 20' to be inserted into slot 30 and held in place as shown in FIG. 2.

The end of the toothed portion 34 of the ratchet strip is inserted through the locking end 38 and pulled tight, whereupon the unused end may be clipped off at 42.

The second embodiment of the present invention is illustrated in FIGS. 5 and 6. A block 44, similar to block 28, is provided and has a slot 46 therein which is flared at its outer end 48. The block is of a resilient material such as rubber or the like.

A bracket is attached to the block to mount the block on shank 19 of reel 18. The bracket includes two halves 50 and 52 which are clamped over the shank and fastened by bolts 54 and wing nuts 56.

OPERATION

When a fisherman decides to move from fishing spot to fishing spot he reels in his line 20, leaving a length of the free end 20' of the line sufficient to reach handle 12 of his pole 10. The line is pressed into slot 30 in resilient block 28 at a point adjacent hook 22.

The line may then be tensioned by reeling in a little more of the line. This pulls the eye of hook 22' into abutment with the side of block 28 as shown in FIG. 1. The line is then secured, but may be released at will.

It is important to note that bait 24 on hook 22 is undamaged by securing the line in the manner of the present invention. Only the line is engaged, not the curved portion or the point of the hook.

Such abutment as described with the eye 22' of the hook may also be made with a sinker, bobber or the like. Even so, the line only may be secured at any point without tensioning.

Having described my invention in its preferred embodiments, I claim:

1. A fishing line holder for supporting the free end of a fishing line, a length of which extends from the tip of a fishing pole, the holder comprising:
   (a) a block having a slot therein for receiving the line; and
   (b) mounting means for securing the block on the pole, the mounting means comprising a ratchet strip having:
      (1) a locking end;
      (2) a curved portion having substantially the same radius as the pole, and mounting the block; and
      (3) a flexible toothed portion for encircling the pole and engaging the locking end.

2. The fishing line holder of claim 1 wherein the block is integrally formed with the ratchet strip.

3. The fishing line holder of claim 1 wherein the slot in the block is flared at its outer end to facilitate engagement with the line.

4. The fishing line holder of claim 1 wherein the block is of resilient material.

5. A fishing apparatus comprising in combination:
   (a) a fishing pole;
   (b) a length of fishing line extending from the tip of the pole;
   (c) a block mounted on the pole and having a slot therein for receiving and releasably securing the free end of the line when the line is temporarily not in use for fishing; and
   (d) mounting means for securing the block on the pole, the mounting means comprising a ratchet strip having:
      (1) a locking end;
      (2) a curved portion having substantially the same radius as the pole, and mounting the block; and
      (3) a flexible toothed portion for encircling the pole and engaging the locking end.

6. The fishing apparatus of claim 5 further comprising a hook attached to the end of the line, and means mounted on the pole for tensioning the line so that the hook abuts the side of the block.

7. The fishing apparatus of claim 5 further comprising a reel mounted on the pole, and wherein the block is mounted on the pole behind the face of the reel.

* * * * *